United States Patent [19]

Devis

[11] 4,008,880
[45] Feb. 22, 1977

[54] WIRE TIGHTENER

[76] Inventor: Michel Devis, 448 Geiger St., Berea, Ohio 44017

[22] Filed: July 7, 1975

[21] Appl. No.: 593,204

[52] U.S. Cl. .................................. 254/161; 188/82.1
[51] Int. Cl.² .......................................... B66D 1/04
[58] Field of Search .......... 254/164, 163, 162, 161, 254/51, 79; 292/209, 107; 24/269; 188/82.1, 82.7, 82.74, 82.77

[56] References Cited

UNITED STATES PATENTS

| | | | |
|---|---|---|---|
| 2,464,832 | 3/1949 | Stuart | 254/161 X |
| 3,606,938 | 9/1971 | Heyne | 188/82.1 |
| 3,811,655 | 5/1974 | Foster | 254/161 |

FOREIGN PATENTS OR APPLICATIONS

| | | | |
|---|---|---|---|
| 648,491 | 8/1928 | France | 254/161 |
| 1,162,444 | 4/1958 | France | 254/161 |
| 646,020 | 7/1928 | France | 24/269 |
| 1,257,584 | 2/1961 | France | 254/161 |
| 741,116 | 11/1955 | United Kingdom | 254/163 |

*Primary Examiner*—L. J. Paperner
*Assistant Examiner*—Donald W. Underwood
*Attorney, Agent, or Firm*—Donnelly, Maky, Renner & Otto

[57] ABSTRACT

A wire tightener or puller includes a frame with a shaft journalled between and through holes in the sides of the frame. Projections on the shaft adjacent the inside of the frame maintain the shaft in position and cam strike stops in the frame adjacent the holes cooperate with the projections to act as a ratchet precluding the shaft from rotating in one direction passed the strikes. One wire end is secured to the frame and the other to the shaft with the latter being provided with a squared or flattened end so that it may be rotated in the one direction permitted with a suitable tool to wind one end of the wire on the shaft with the projections camming over the cam strikes. The resilience of the frame permits the sides to separate slightly enabling the projections to cam over such cam strikes.

17 Claims, 5 Drawing Figures

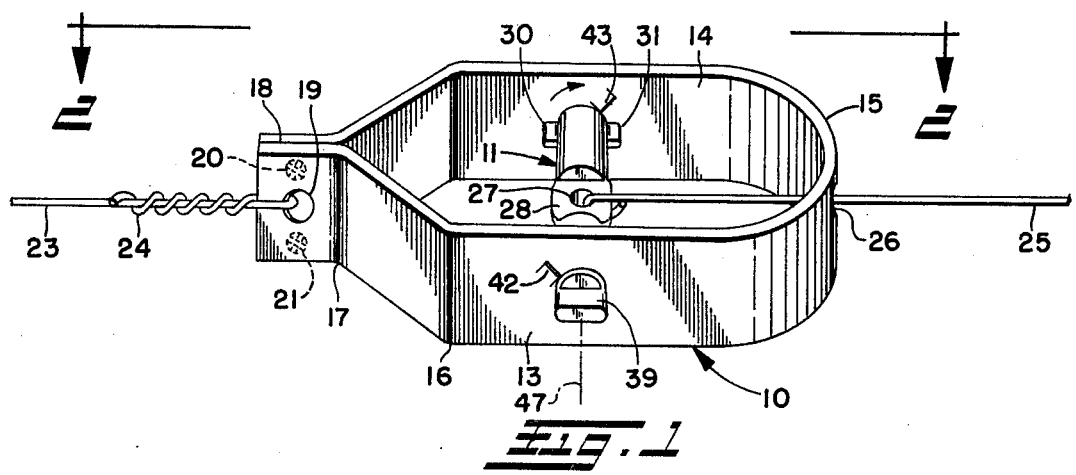
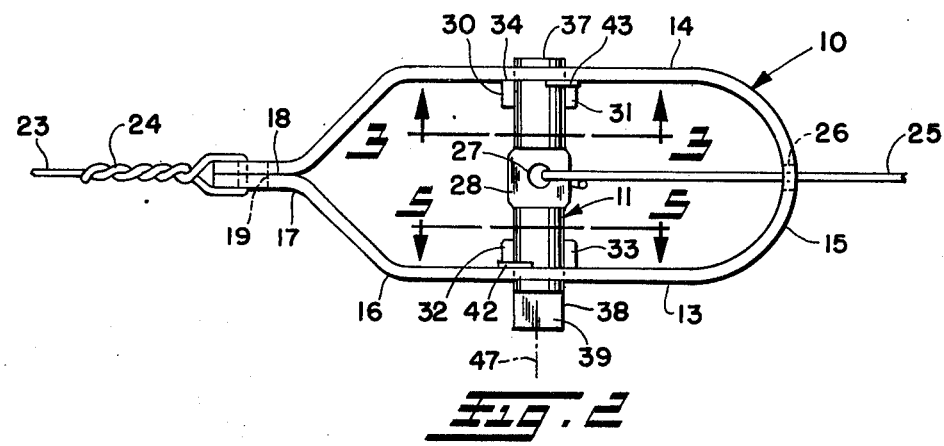
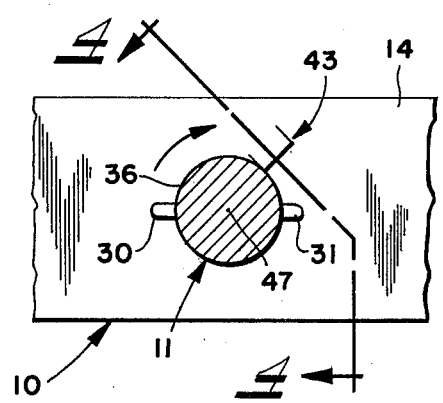
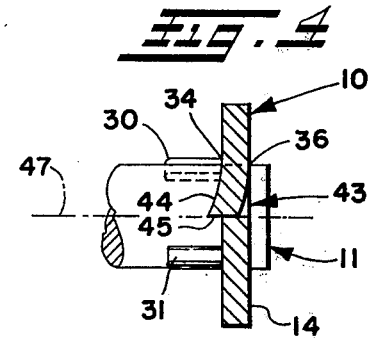
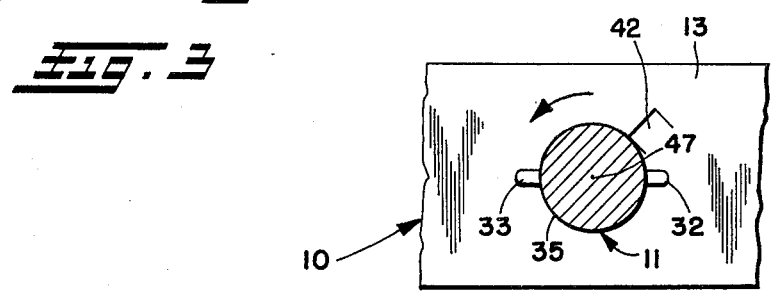

WIRE TIGHTENER

This invention relates generally as indicated to a wire tightener and more particularly to a wire puller and splicer which is of such inexpensive construction that it may be left in place on the wire.

Wire used as guy lines, barbed wire, fence wire, or substantially any type of wire or line may periodically require tightening or splicing. For example, barbed wire fencing may tend to sag over a period of time. If such fencing is equipped with the tightener of the present invention, the barbed wire may readily and easily be returned to the desired tension. Guy lines for antennae, trees, or the like, may periodically require tightening or adjustment, and if such lines are equipped with the present invention, such tightening or adjustment may readily be accomplished.

The present invention also facilitates the splicing of broken wire by simply attaching the two broken ends of the wire to the device, tightening to the desired degree, and leaving the tightener in place.

Most wire tighteners are relatively complex devices having several parts and are difficult to operate and maintain. If a ratchet mechanism is employed, it is of the usual ratchet wheel and pivoting dog type. Most such devices are relatively complex having a number of moving parts and are too expensive of manufacture to be left in place on the line. Examples of such prior devices are shown in the following U.S. Pat. Nos.:

| | |
|---|---|
| 152,784 - Westenhaver et al | 2,130,477 - Alexander |
| 966,828 - Habben | 2,451,389 - Howe |
| 1,318,078 - Hettinger | 2,597,351 - MacKenzie |
| 2,020,175 - Durr | 598,494 - Bennett |

The wire tightener of the present invention is in the form of a clevis with the ends bent to lie adjacent each other and secured together. A hole extends through the joined ends and a shaft extends between the separated sides of the clevis. The shaft is provided with interior projections to maintain the shaft axially in position and such projections cooperate with cam strikes on the sides of the clevis, the entire clevis or frame being somewhat resilient so that as the shaft turns, the projections cam over the cam strikes and act in connection therewith as a ratchet mechanism. Accordingly, the shaft can be turned in only one direction past the cam strikes.

The shaft is provided with an aperture, and a wire extending through a hole in the bight portion of the clevis is secured thereto. The opposite wire end is secured to the hole through the joined ends of the clevis.

The projecting end of the shaft may be squared or flattened so that a suitable tool such as a crank or wrench may be employed to turn the shaft causing the wire to wrap upon the shaft pulling the wire ends toward each other, thus tightening the wire line.

It is accordingly a principal object of the present invention to provide a simplified, low-cost wire tightener which may be left in place on the line to be tightened.

Another principal object of the present invention is the provision of a wire tightener utilizing only two readily manufactured and assembled parts.

Still another principal object of the present invention is the provision of a wire tightener utilizing a simplified ratchet mechanism.

Still another object of the present invention is the provision of a wire tightener or splicer which may readily be installed and used.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a perspective view of a wire tightener in accordance with the present invention installed and ready for use;

FIG. 2 is a top plan view of the wire tightener of FIG. 1 taken from the line 2—2 of FIG. 1;

FIG. 3 is an enlarged fragmentary vertical section taken substantially on the line 3—3 of FIG. 2;

FIG. 4 is an enlarged fragmentary vertical section taken substantially on the line 4—4 of FIG. 3; and FIG. 5 is a view similar to FIG. 3 but taken on the line 5—5 of FIG. 2.

Referring now to said annexed drawing and more particularly to FIGS. 1 and 2, it will be seen that the wire tightener of the present invention comprises but two parts. One part is frame 10 and the other part is shaft 11.

The frame 10 is in the form of a clevis having side walls 13 and 14 which are generally parallel to each other with such side walls being connected at one end by a circular or rounded bight portion 15. The two sides of the clevis frame are each bent as indicated at 16 and 17 so that the ends lie adjacent each other as indicated at 18. Each adjacent end of the frame is provided with an aligned aperture as seen at 19 and such adjacent ends are interconnected as by spot welding at 20 and 21 above and below the aperture. One end of the wire to be tightened or spliced indicated at 23 is passed through the aperture 19 and wrapped upon itself as indicated at 24.

The opposite end of the wire to be tightened seen at 25 passes through aperture 26 in the center of the bight portion of the frame and also passes through aperture 27 in the center of flat 28 in the middle of shaft 11. Such wire 25 may be simply folded upon itself as indicated sufficiently to secure the same to the shaft for tightening.

In addition to and in the same plane as the flat 28, the shaft 11 is provided with lateral projections indicated at 30, 31, 32 and 33. The outer edges 34 of each of the projections lie adjacent the interior of the sides 13 and 14 of the frame 10. The shaft, beyond such projections, passes through apertures 35 and 36 in the sides of the frame. The shaft 11 projects slightly beyond the frame side 14 as indicated at 37 and considerably further beyond the frame side 13 as indicated at 38. The more extensively projecting end 38 of the shaft is flattened as seen at 39 so that a wrench or other suitable tool may be applied to the shaft for turning the same in the direction of the arrows seen in FIGS. 1, 3 and 5. The flat 39 is in the same plane as the flat 28 as well as the projections 30 through 33.

The projections 30 through 33 serve two purposes. The first purpose is to retain the shaft axially in position between the sides of the frame. The second purpose is to act in cooperation with cam strike stops 42 and 43 struck inwardly from the sides 13 and 14 of the frame, respectively. The form of the strikes is seen in detail in FIG. 4, and each strike provides in inwardly directed cam surface 44 and a stop surface 45. The outer edges 34 of the projections 30 through 33 ride up the cam surface 44 with the natural resiliency of the clevis or frame permitting the sides to separate slightly. When the projection passes the stop surface 45, the sides will spring together so that the shaft 11 may be rotated continuously only in the direction of the arrows. The projections will not move in a reverse direction because of the interengagement with the stop surface 45.

As seen more clearly in comparing FIGS. 3 and 5, the inwardly directed cam strikes in the opposite walls of the frame lie adjacent the respective apertures for the shafts and are offset about the axis 47 of the shaft 90°. With the four shaft projections and the two offset cam strikes, this provides a cam stop for every 90° of rotation of the shaft 11. Smaller increments between cam stops can, of course, be provided by additional cam strikes and/or projections.

Both the frame and the shaft may be manufactured by conventional progressive die, punchpress operations with the shaft being assembled with the frame prior to the joining and spot welding of the adjacent ends. Both parts are preferably protected against rust by suitable cadmium or zinc plating.

The frame may be made of 1020 carbon steel and may be on the order of 14 or 16 gauge depending upon the size of the tightener. In any event, the material from which the frame is made will be of sufficient rigidity to provide the rigid cam stops, yet the frame as a whole is sufficiently resilient to permit the sides to separate slightly as the projections cam over the cam strike stops.

The wire tightener of the present invention may be used in a wide variety of pulling, tightening, or splicing requirements. For example, the tightener of the present invention may be utilized in guy wires for antennae or trees which may require periodic tightening or adjustment. The tightener may be used with substantially any type of fence wire and is particularly useful in barbed wire applications. Since the tightener is electrically conductive, it may be used to tighten or splice electrically conductive line. In any event, once the tightener is installed, it is left in place for repeated use as the line again requires tightening or adjustment. Depending upon the size of the tightener employed, it may pull in several feet of wire in a wide variety of applications.

Also, it will be appreciated that the aperture 19 may be utilized for anchoring the tightener to a fence post or other permanent structure rather than one end of the wire.

It can now be seen that there is provided a very low-cost, easily manufactured wire tightener for a wide variety of applications.

I, therefore, particularly point out and distinctly claim as my invention:

1. A wire tightener comprising a frame having substantially parallel sides, a shaft journalled between and through holes in the sides of said frame, means to secure a wire end to said shaft, projections on said shaft between and adjacent the sides of said frame maintaining said shaft in position, and a strike in said frame contiguous with and adjacent one of said holes cooperating with the adjacent projection to preclude said shaft from rotating in one direction past said strike, said strike including a cam surface and a stop surface, the latter extending generally normal to the side of the frame and generally radially of the adjacent hole, the sides of said frame being resiliently urged apart as the edge of the projection moves over said cam surface as the shaft rotates in the opposite direction.

2. A tightener as set forth in claim 1 wherein said frame has a curved end with an aperture in the center thereof for such wire end to pass therethrough.

3. A tightener as set forth in claim 2 wherein said frame includes opposite said curved end a single point anchor to which another wire end may be connected.

4. A tightener as set forth in claim 3 wherein said single point anchor is formed by bending the sides of said frame to lie adjacent each other, and means to secure the same together.

5. A tightener as set forth in claim 4 including a hole through said adjacent sides through which such another wire end may be passed and wrapped upon itself.

6. A tightener as set forth in claim 1 including a strike in each side of said frame.

7. A tightener as set forth in claim 6 wherein the strikes in each side of said frame are offset from each other 90° with respect to the axis of said shaft.

8. A tightener as set forth in claim 7 including diametrically opposite projections on said shaft adjacent each side of said frame.

9. A wire tightening device comprising a frame including parallel sides, a shaft extending between said sides, means to secure a wire to said shaft, projections on said shaft adjacent the sides, and a cam strike in one of said sides cooperating with one of said projections to prevent said shaft from rotating in one direction, said frame being of sufficient resilience to permit said sides to move relative to each other slightly as said projection cams over said cam strike as said shaft rotates in the opposite direction.

10. A device as set forth in claim 9 wherein said projections are between and adjacent the sides, and said frame is of sufficient resilience to permit said sides to separate slightly as said projection cams over said cam strike as said shaft rotates in the opposite direction.

11. A device as set forth in claim 9 wherein said cam strike includes a cam surface and a stop surface, the cam surface engaging the axial end of the projection as the shaft is rotated in one direction, and the stop surface engaging the radial surface of said projection as the shaft is rotated in the opposite direction.

12. A device as set forth in claim 9 including two diametrically opposed projections on said shaft adjacent each side of said frame.

13. A device as set forth in claim 12 including a cam strike in each side of said frame, one cam strike being offset from the other 90° with respect to the axis of said shaft.

14. A device as set forth in claim 12 including a flat in the center of said shaft with a hole punched therethrough to which a wire end is adapted to be secured.

15. A device as set forth in claim 14 including a flat on an end of said shaft outside of said frame, said center flat, outside flat and projection all lying in substantially the same plane.

16. A device as set forth in claim 9 wherein said frame has a curved end and an opposite joined end.

17. A device as set forth in claim 16 including a hole in the center of said curved end for such wire to pass therethrough to be secured to said shaft, and means to connect another wire end to said joined end.

* * * * *